United States Patent
John et al.

(10) Patent No.: US 10,901,894 B2
(45) Date of Patent: Jan. 26, 2021

(54) ALLOCATING AND ACCESSING MEMORY PAGES WITH NEAR AND FAR MEMORY BLOCKS FROM HETEROGENEOUS MEMORIES

(71) Applicants: Oracle International Corporation, Redwood City, CA (US); The Board of Regents of the University of Texas System, Austin, TX (US)

(72) Inventors: Lizy John, Austin, TX (US); Jee Ho Ryoo, Mountain View, CA (US); Hung-Ming Hsu, Austin, TX (US); Karthik Ganesan, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 98 days.

(21) Appl. No.: 15/853,665

(22) Filed: Dec. 22, 2017

(65) Prior Publication Data
US 2018/0260323 A1 Sep. 13, 2018

Related U.S. Application Data

(60) Provisional application No. 62/469,974, filed on Mar. 10, 2017.

(51) Int. Cl.
*G06F 12/06* (2006.01)
*G06F 12/02* (2006.01)
(Continued)

(52) U.S. Cl.
CPC ...... *G06F 12/0638* (2013.01); *G06F 12/0223* (2013.01); *G06F 12/08* (2013.01);
(Continued)

(58) Field of Classification Search
CPC .. G06F 12/0638; G06F 12/08; G06F 12/0864; G06F 12/0223; G06F 2212/502;
(Continued)

(56) References Cited

U.S. PATENT DOCUMENTS 5,263,140 A 11/1993 Riordan
9,583,182 B1 * 2/2017 Wilkerson .......... G06F 12/0804
(Continued)

OTHER PUBLICATIONS

C. Chou, et al., "CAMEO: A Two-Level Memory Organization with Capacity of Main Memory and Flexibility of Hardware-Managed Cache", In Proceedings of the 47th Annual IEEE/ACM International Symposium on Microarchitecture, 2014, pp. 1-12.
(Continued)

*Primary Examiner* — Hong C Kim
(74) *Attorney, Agent, or Firm* — Robert C. Kowert; Kowert, Hood, Munyon, Rankin & Goetzel, P.C.

(57) ABSTRACT

A heterogeneous memory system is implemented using a low-latency near memory (NM) and a high-latency far memory (FM). Pages in the memory system include NM blocks stored in the NM and FM blocks stored in the FM. A page is assigned to a region in the memory system based on the proportion of NM blocks in the page. When accessing a block, the block address is used to determine a region of the memory system, and a block offset is used to determine whether the block is stored in NM or FM. The memory system may observe memory accesses to determine the access statistics of the page and the block. Based on a page's hotness and access density, the page may be migrated to a different region. Based on a block's hotness, the block may be migrated between NM and FM allocated to the page.

20 Claims, 11 Drawing Sheets

(51) Int. Cl.
*G06F 12/0864* (2016.01)
*G06F 12/08* (2016.01)
*G06F 12/1027* (2016.01)

(52) U.S. Cl.
CPC ...... *G06F 12/0864* (2013.01); *G06F 12/1027* (2013.01); *G06F 2212/1016* (2013.01); *G06F 2212/502* (2013.01); *G06F 2212/604* (2013.01)

(58) Field of Classification Search
CPC ......... G06F 2212/1016; G06F 12/1027; G06F 2212/604
USPC .......................... 711/117, 118, 129, 206, 133
See application file for complete search history.

(56) References Cited

U.S. PATENT DOCUMENTS

| | | | | |
|---|---|---|---|---|
| 2009/0172498 | A1* | 7/2009 | Shlick | G06F 11/1064 714/764 |
| 2016/0179375 | A1* | 6/2016 | Kirvan | G06F 12/0246 711/153 |
| 2016/0283391 | A1* | 9/2016 | Nilsson | G06F 12/0893 |
| 2017/0090780 | A1* | 3/2017 | Anantaraman | G06F 3/0604 |
| 2017/0147214 | A1* | 5/2017 | Ray | G11C 5/04 |
| 2018/0059993 | A1* | 3/2018 | Lee | G06F 12/0246 |
| 2018/0088853 | A1* | 3/2018 | Kotra | G06F 12/0804 |
| 2018/0095884 | A1* | 4/2018 | Kaminski | G06F 3/0611 |
| 2018/0189188 | A1* | 7/2018 | Kumar | G06F 12/1009 |

OTHER PUBLICATIONS

Djordje Jevdjic, et al., "Unison Cache: A Scalable and Effective Die-Stacked DRAM Cache", In Proceedings of the 47th Annual IEEE/ACM International Symposium of Microarchitecture (MICRO 2014), 2014, pp. 1-13.

Djordje Jevdjic, et al., "Die-Stacked DRAM Caches for Servers—Hit Ratio, Latency, or Bandwidth? Have it all with Footprint Cache", In Proceedings of the 40th International Symposium on Computer Architecture (USCA 2013), 2013, pp. 1-12.

Mitesh R. Meswani, et al., "Heterogeneous Memory Architectures: A HW/SW Approach for Mixing Die-Stacked and Off-Package Memories", IEEE, 2015, pp. 1-11.

Moinuddin K. Qureshi, et al., "Fundamental Latency Trade-offs in Architecting DRAM Caches—Outperforming Impractical SRAM-Tags with a Simple and Practical Design", In Proceedings of the 2012 45th Annual IEEE/ACM International.

Luiz Ramos, et al., "Page Placement in Hybrid Memory Systems", In Proceedings of the International Conference on Supercomputing (ICS '11), 2011, pp. 1-11.

Jaewoong Sim, et al., "Transparent Hardware Management of Stacked DRAM as Part of Memory", In Proceedings of the 2014 47th Annual IEEE/ACM International Symposium of Microarchitecture (MICRO-47) 2014, pp. 1-12.

* cited by examiner

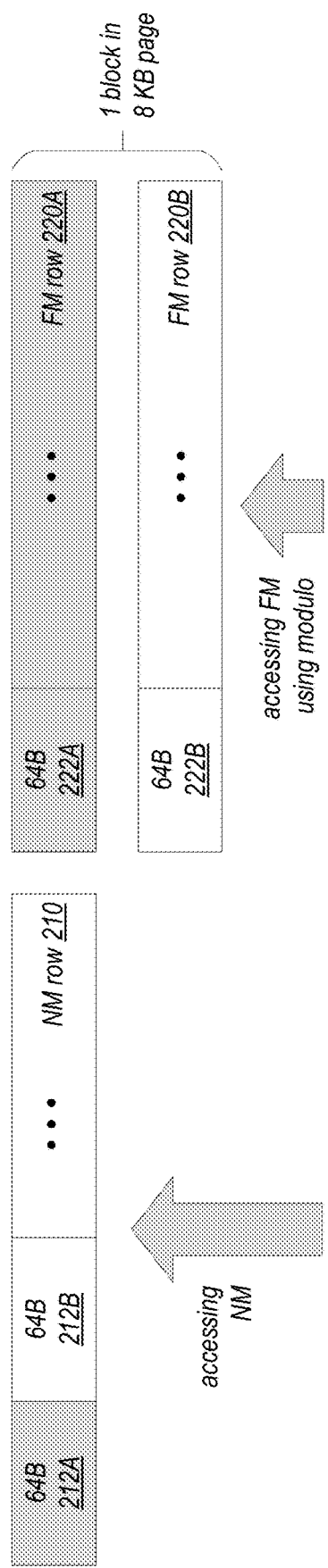
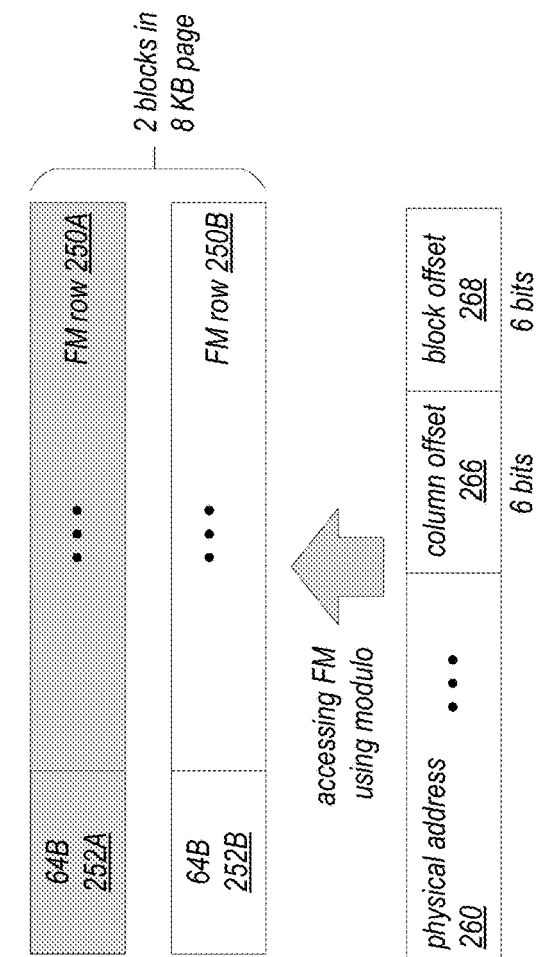
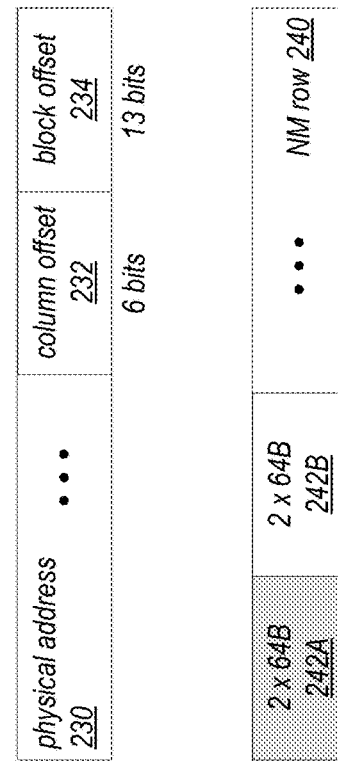
FIG. 2A
FIG. 2B

ALLOCATING AND ACCESSING MEMORY PAGES WITH NEAR AND FAR MEMORY BLOCKS FROM HETEROGENEOUS MEMORIES

BACKGROUND

This application claims priority to U.S. Provisional Application No. 62/469,974 filed Mar. 10, 2017 titled "Methods to Utilize Heterogeneous Memorys with Variable Properties" which is herein incorporated by reference in its entirety.

TECHNICAL FIELD

This disclosure relates to memory systems, in particular memory systems that use heterogeneous types of memory.

DESCRIPTION OF THE RELATED ART

As current main memory technology scaling is coming close to an end due to its physical limitations, many emerging memory technologies are coming to the market to fill the scaling gap. Although these technologies have attractive characteristics such as high capacity, none has comparable characteristics as current dynamic random-access memory (DRAM) technology.

Prior work on data management in heterogeneous memory has optimized one or two components in the computing stack, and thus, has only been able to achieve suboptimal performance improvement. For example, hardware optimization was attempted to migrate data between two memories at the cache line granularity (e.g., 64 B in x86-64). While this technique incurs low overheads, the mapping of data is fixed at design time and the operating system (OS) does not optimize the data placement as it is oblivious to memory heterogeneity. Furthermore, OS data management approaches are good at optimally placing larger chunks of data. However, since the minimum OS manageable memory size is quite large (e.g., 4 KB in x86-64 and 8 KB in SPARC™), a lot of precious low latency memory space is left untouched as many of these cache lines are not accessed during runtime. Finally, prior work has assumed symmetric memory layout where data is laid out identically within one memory technology. Laying out data symmetrically when different memory rows have different access characteristics leads to suboptimal performance and wastage of precious low latency. Thus, in the era of heterogeneous memory, more intelligent cooperative multi-component data management will be needed in future systems.

BRIEF DESCRIPTION OF THE DRAWINGS

FIGS. 2A and 2B illustrate an example physical data memory layout of a heterogeneous memory system, according to some embodiments.

Figure 1:
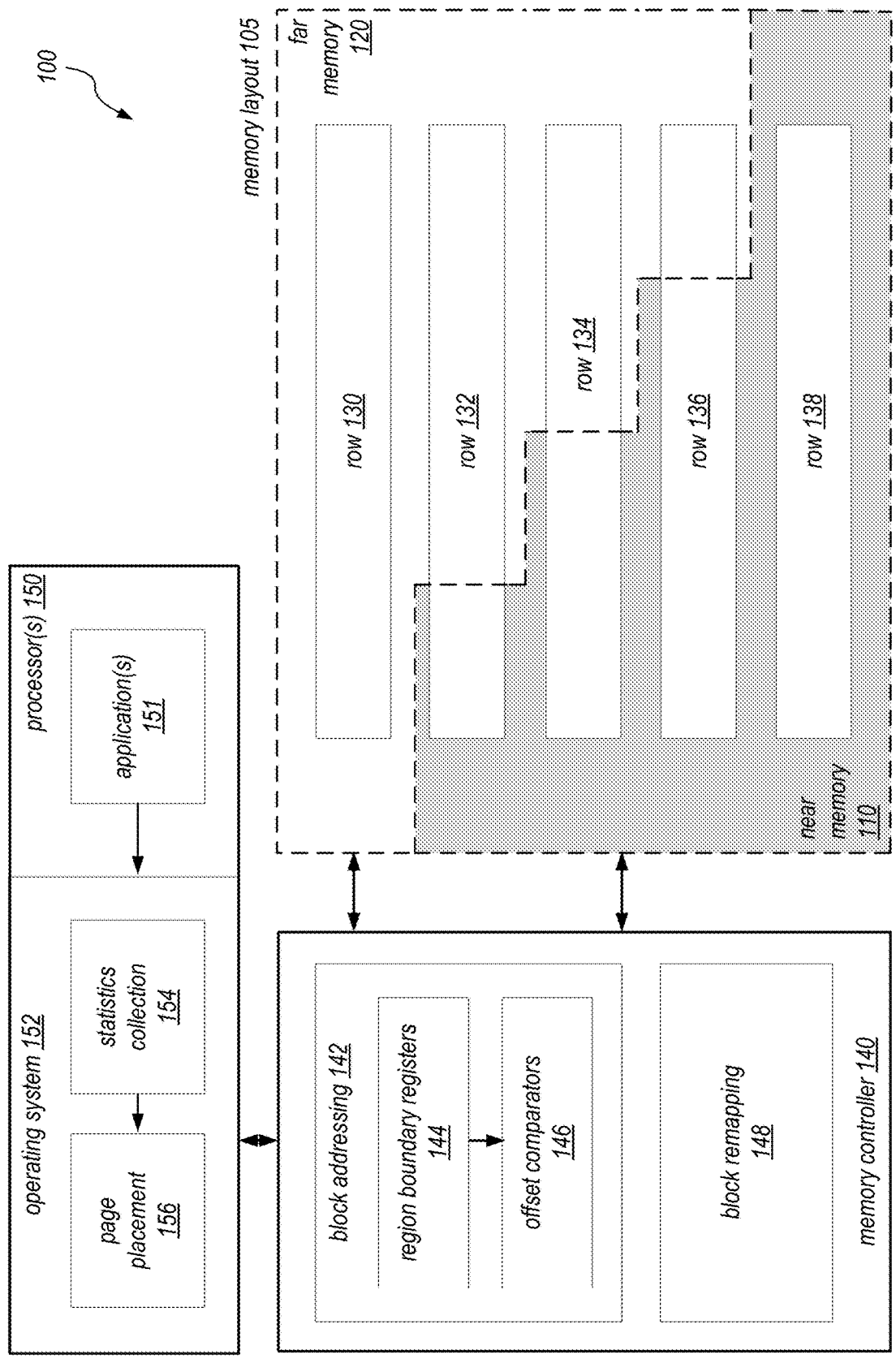
FIG. 1 illustrates a logical view of an example data layout of a heterogeneous memory system, according to some embodiments.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

Systems and methods are described herein to implement a memory management scheme that incorporates three different components in the computing stack, namely memory layout, operating system data placement, and hardware data remapping.

In some embodiments, a heterogeneous memory layout is implemented where two memories are laid out asymmetrically. The operating system may be aware of this layout and places pages with different locality characteristics in different regions of memory. In some embodiments, a custom hardware performs the data remapping to optimize the data placement at finer granularity than what is visible to the operating system. Using the disclosed systems and methods, a multi-component cooperative memory management scheme may be implemented to achieve significant improvements to the overall system performance.

The DRAM technology scaling helps computers to achieve continued performance improvement by offering higher capacity as well as higher bandwidth. However, the scaling rate has recently slowed down and is expected to halt as DRAM technology gets very close to the physical limits. Non-volatile technologies keep the capacity scaling as their density is higher while others have other superior characteristics such as higher bandwidth, but these all come at costs. For example, non-volatile memories (NVMs) have much higher access latency whereas die-stacked memories have much smaller capacity. In this disclosure, the term "Near Memory" (NM) refers to fast, capacity constrained memory, and the term refers to "Far Memory" (FM) refers to slow, large capacity memory. In some embodiments, the NM may be located physically close to the processor cores than FM. The term "migration" refers to migration of data between NM and FM.

Computer systems may employ both types of memories so that one will act as high capacity memory whereas the other will act as low latency memory. The goal is to place desirable data in low latency memory, so that most data accesses are serviced at lower latency. However, since this memory is capacity constrained, the memory footprint of common applications is not likely to fit in the limited memory. It is likely that a large chunk of data may be present in high capacity memory. Consequently, intelligently choosing the data to be placed in the low capacity memory requires sophisticated orchestration of many components across the computing stack.

Spatial locality of an application is a good indicator on how densely accesses are made in the physical address range. If locality is high, this means nearby addresses are accessed, and in this case, a large data management granularity is preferred. If extra contiguous data is brought in to NM, then it is highly likely to be used in the future in high locality cases. If the spatial locality is low, then the extra data brought in is wasteful since it merely occupies the space in NM and wastes migration bandwidth.

Empirical observations show that different applications show different memory access characteristics. Therefore, fixing the migration granularity to one size statically as in the case of hardware managed schemes is not ideal as different applications access memory differently. For example, classification shows that a majority of pages have only 1 block usage within 8 KB of page space. In this situation, it is wasteful to use any migration granularity larger than 1 block. On the other hand, some applications show an opposite behavior where a majority of pages have all of its blocks demanded. Other measured benchmarks fall between these two extremes.

Furthermore, when a few blocks are accessed within a page, they are not necessarily contiguous. This means that there are many blocks between demanded blocks that are not accessed. Such issues are called fragmentation where there are unaccessed blocks between demanded blocks. The pages with fragmentation cannot achieve optimal performance in previously proposed schemes. Simply varying the data management granularity cannot solve issues with fragmentation because the undemanded blocks cannot be filtered out. In prior hardware-based techniques, the filtering of undemanded blocks only saves bandwidth. The precious NM capacity is still reserved for those undemanded blocks and cannot be used for any other blocks or pages.

Temporal locality of an application represents how repeatedly pages are accessed. Heterogeneous memory systems are composed of memory technologies whose access latencies are an order of magnitude higher than static random access-memory (SRAM) latency. Therefore, naively migrating any page may result in degraded performance as the data migration costs are high. In such scenario, only pages whose access counts are high enough have to be involved in data migration between NM and FM. Low access count pages do spend more time on migrating the data, so even though it benefits from NM's lower access latency, the benefits are not enough to offset the costs.

From empirical observations, it is seen that in most applications, a small subset of pages are responsible for a large fraction of total accesses. In this disclosure, pages whose access counts are high are referred to as "hot" pages. Since not all pages can fit in capacity constrained NM, those hot pages may provide the most system performance benefits when placed in NM. Thus, a heterogeneous management scheme must be able to detect these hot pages.

Furthermore, applications have different spatial locality characteristics and make different memory access patterns. Access density analysis shows that different pages access different regions of memory. Although each page makes a distinct memory access pattern, if such pattern repeats, then it provides an opportunity to predict future memory accesses.

Empirical evidence indicates that for most applications, more than 70% of pages accessed during a given time interval has a repeated memory access pattern. Interestingly, it is observed that such high fraction stays across the application execution. What it implies is that although different regions of memory are accessed differently, the access pattern of each region (page) repeats in a regular pattern. This result suggests that an intelligent migration scheme can use the previous memory access patterns to predict the memory access patterns of the future since they are highly likely to be repeated.

In light of this observed data on memory usage, embodiments of an improved heterogeneous memory system are disclosed. The heterogeneous memory system optimizes various layers in the computing stack. In some embodiments, a heterogeneous memory data layout is customized to allow multiple subblock swapping between FM and NM within the same page. In some embodiments, the operating system (OS) periodically reorganizes pages to a location that best meets the spatial locality of each page. The cross-layer implementation has resulted in an average performance improvement of 40% over the state-of-the-art scheme by placing as much useful data as possible in the NM and minimizing unnecessary waste of capacity in the capacity constrained NM.

In some embodiments, the heterogeneous memory system may implement an asymmetric memory layout where different regions of memory have various capacity ratios of two memories with different technologies. For example, the low latency to high capacity memory capacity ratio may be 1:3 in some regions, so ⅓ of the data in this memory region can be placed in low latency memory. In some other regions, the ratio may be 1:64, so only 1/64 of the data can be placed. The ratios may be programmed and recognized by memory controller at boot time, and the addressing to different types of memory may be done by memory controller transparent to software. In some embodiments, what data to place in what region is not a decision that is made by a low-level memory controller. In some embodiments, the decision may be left to the next component in the computing stack, and the memory layout may be made ready for the next component.

In some embodiments, the heterogeneous memory system implements an OS page placement scheme that is optimized to exploit the asymmetric memory. In some embodiments, the OS is modified so that it is aware of the asymmetric memory layout as well as different memory ratios in different regions in the physical address space. The OS may use the locality statistics of each page and place data in an appropriate asymmetric memory region that is most beneficial to each page.

In some embodiments, the heterogeneous memory system implements a hardware remapping scheme that maximizes the low latency capacity constrained memory by performing fine grain migrations. In some embodiments, the memory visibility of the OS is limited to the minimum OS page size, which is considerably larger than that of hardware. For example, memory subsystems in some processors may work at the cache line granularity, which is commonly at 64 B. Therefore, in some embodiments, a fine tuning of 64 B block placement within the OS page may be done by hardware. Using a combination of these techniques, the disclosed memory system outperforms prior systems where they only optimized data placement at one component in the computing stack, which has limited visibility as well as abilities.

Memory Layout

FIG. 1 illustrates a logical view of an example data layout of the heterogeneous memory system, according to some embodiments. As discussed, pages in an application may have different access densities as different numbers of blocks within a page are accessed. Accordingly, in some embodiments, the memory system 100 can take this into account by employing a memory layout 105 that can be customized where different rows of memory blocks use different proportions of NM 110. In some embodiments, rows having the same NM proportions may be grouped into memory regions.

As depicted in the figure, each row 130-138 is associated with a different fraction of NM 110 and FM 120. For example, the row 130 has the entire row composed of FM 120. However, for row 132, a small fraction of the row is given the faster NM 110 capacity. Rows such as rows 130 and 132 maybe useful for pages with low spatial locality as only a small fraction of the pages may be demanded by the application. On the other extreme, row 138 is entirely made of fast NM 110, so it is an ideal location for pages with high spatial locality where most of blocks within the page is demanded. Such unconventional memory layout 105 allows to maximize the space usage in the capacity constrained NM 110. As discussed below, in some embodiments, only demanded blocks may be allowed to occupy the NM space 110.

In some embodiments, the memory layout 105 may have a number of different proportions of NM 110 and FM 120 as shown in the figure. The physical address 0 may start from the top and the largest physical address may end in the bottom region where a page is composed of 100% NM 110. In some embodiments, the system 100 may include a memory controller 140, which may implement a block addressing component 142 and a block remapping component 148. The block addressing component 142 may be configured to take block addresses and access the far memory 120 or near memory 110.

In some embodiments, the block addressing component 142 may implement a number of boundary registers 144, which may be used to mark the transition in the regions. Also, each region may have a preset comparator 146 that specifies whether blocks in that region are in NM 110 or FM 120. Using such auxiliary hardware implemented in the memory controller 140, the access to different memory may be initiated as follows. First, the physical address is compared against the boundary registers 144. Second, the request is forwarded to appropriate regions based on the results of the comparison. Third, an offset of the physical address is compared against auxiliary comparator 146 for the appropriate region. Fourth, the request if forwarded to NM 110 if the offset is smaller than comparator 146 or to FM 120 if the offset larger than comparator 146. In some embodiments, blocks with smallest offsets in each region may be placed in NM 110.

The memory layout 105 may support the actions of the upper layers in the computing stack (e.g., OS or other hardware) to take advantage of it by placing pages with different spatial locality in different regions of memory. In some embodiments, four different regions may be used in the memory layout 105.

In some embodiments, hardware, for example a block remapping component 148 of the memory controller 140, may be used to remap blocks in the memory layout 105. In some embodiments, the block remapping component 148 may migrate blocks between the NM 100 and FM 120. The migration may be performed after an OS page placement to swap hot blocks (e.g., blocks exhibiting high spatial locality) into NM 110.

In some embodiments, the system 100 may include one or more processors 150 which may be used to execute an operating system 152. The OS 152 may host one or more applications 151, also executed by the one or more processors 150. In some embodiments, the OS 152 may implement a statistics collection module 154, which may collect statistics from the pages accesses received by from the applications 151. The statistics may include locality statistics of each memory page currently being used, and the statistics may be used by the OS to place memory pages into different regions of the memory layout 105, based on the locality characteristics of the page. In some embodiments, the OS 152 may implement a page placement module 156, which may observe the statistics collected by the statistics collection module 154, and periodically place the memory pages in different memory regions using the statistics.

FIGS. 2A and 2B illustrate an example physical data memory layout of a heterogeneous memory system, according to some embodiments. FIG. 2A depicts the addressing used when accessing the configuration where one block out of an 8 KB page resides in NM. In some embodiments, which configuration to access is predetermined by using the bound registers 144 described in connection with FIG. 1. In some embodiments, a comparator (e.g. comparator 146) is used to check whether the request is to the block offset 0 or not. If so, then it accesses NM (only block 0 resides in NM since only 1 block can reside in NM). When accessing NM, the column offset 232 is 13 bits from the least significant bit as every 8 KB has only one block in NM row 210. On the other hand, if the comparator check fails, then the system accesses FM. The FM access uses column offset 236 that is 6 bits away from the last significant bit (64 B block offset). However, since block 0 is excluded, a modulo operator may be used. FIG. 2B shows an example access scheme for the configuration where 2 blocks out of 8 KB reside in NM. The accessing method is similar, but the offset bit width may be different.

OS Page Placement

Given a memory layout where pages with different access densities can be placed, as discussed in FIGS. 1 and 2, the operating system (e.g. OS 152) may use the layout detect the memory pages and place them in appropriate regions of the memory. Since software related overheads may be expensive, in some embodiments, it is desirable to minimize the number of times that the OS intervenes the system. In some embodiments, an epoch based approach may be employed where the OS intervenes at a large interval, which is referred to as an epoch. Between the epoch boundaries, page access statistics may be collected.

In some embodiments, the OS may first detect whether pages are hot or not using a predefined dynamic threshold. For example, some modern processors have counters to detect hot pages. Thus, in some embodiments, a page access count may be monitored, and when it crosses the threshold, then one special bit in a Page Table Entry (PTE) may be set. This bit may be used to indicate that a page is hot (e.g., access frequently during a given period). In some embodiments, the predefined threshold is dynamically adjusted at each epoch boundary, so that the number of pages selected is close to the number of pages that can be accommodated in memory layout regions that has a small fraction or more of NM. After the hot page selection, the OS may be able to detect the access density of each page. Since the minimum memory visibility of the OS is the page size, in some embodiments hardware support may be used to detect which blocks within a page are accessed. In some embodiments, the translation lookaside buffer (TLB) structure may be extended to include a bit vector where each bit indicates whether a block in the bit location is accessed or not. Each block within a page may have its own bit. When the page is evicted from TLB, the number of set bits in the bit vector may be summed up and used to determine the access density. In this manner, the access density of pages (e.g., the number of distinct blocks that were accessed in that page) may be stored in PTE.

In some embodiments, at the epoch boundary, the OS may interrupt the system and walk down the pages which have the hot page bit set. These pages may then be migrated to appropriate regions according to their access density. For example, if the access density shows that this page has all of its blocks demanded, then it is placed in the last region where the entire page is composed of NM only. In some embodiments, when the OS finishes the placement, then the page placement where the memory layout matches the access density is completed. At this point, the data layout may appear as shown in FIG. 3A.

Figure 3A:
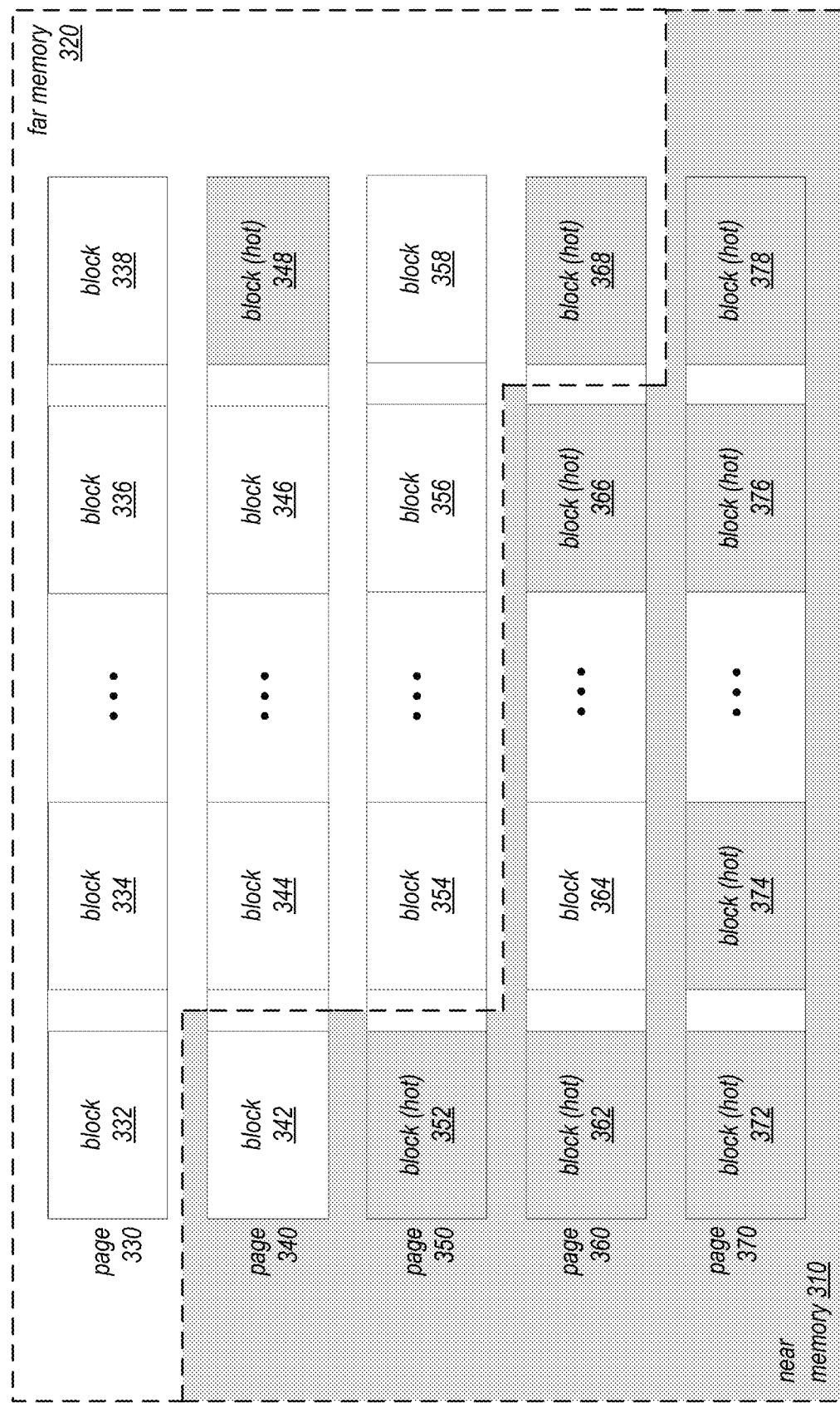
FIG. 3A illustrates an example data memory layout of a heterogeneous memory system after an OS placement of memory pages, according to some embodiments.

FIG. 3A illustrates an example data memory layout of a heterogeneous memory system after an OS placement of memory pages, according to some embodiments. As shown in the figure, the access density of the pages may be matched with the region. In some embodiments, the OS can only place data at the granularity of its page size, so at this point, the page level placement may be done. For example, a page 330 without any hot data (cold pages) may be placed in the first region where there is no NM. As another example, a page 340 with one hot 64 B block is placed correctly in the appropriate region. However, in that page, the desired block is not placed in NM, but in FM, due to its offset. Thus, in some embodiments, the memory system may take an additional step to use hardware to place these 64 B blocks into desired NM space.

Hardware Block Remapping

In some embodiments, after the OS page placement, blocks within a page may still be in their original offset location. Since in some embodiments the memory layout is static with NM memory located near the smallest offset (e.g., offset 0), if hot blocks are located in high offset locations, the memory requests may still be serviced from undesirable FM memory. In order to place hot blocks into NM region, block granularity remap may be implemented in some embodiments. A remap structure may be organized such that each block has its own remap entry. In an example case where there are a 64 B block size and 8 KB page size, each page would have 128 blocks. Thus, 7 bits per each block may be required and they may be stored in the same NM row as data. This would eliminate the need for expensive SRAM overheads as well as performance overheads of accessing a separate NM row to read remap entry. In some embodiments, upon a memory access, the block may be swapped into NM region of a page if not already placed there. If the NM region has enough space to hold more than 1 block (e.g., 64 out of 128 blocks can fit in NM region), then the appropriate offset may be used to place the block in appropriate offset location. In some embodiments, the remapping between NM and FM region within the same page may be done in a direct mapped fashion. Since many regions of memory offer the configuration where more than one block of a page can be simultaneously placed in NM region, the probability of thrashing is reduced.

In some embodiments, the number of offset bits used to swap the requested block into the NM region is different depending on the amount of NM regions in a page. For example, if a page has only one block worth of NM region, then all 7 bits are used to mark the original location of the current block in NM region. As another example, if a page has two blocks worth of NM region, then the least significant 6 bits are used to find the remap location. In some embodiments, when all the hot blocks are heavily accessed, they may likely to be remapped into the NM region of a page. The results are shown in FIG. 3B.

Figure 3B:
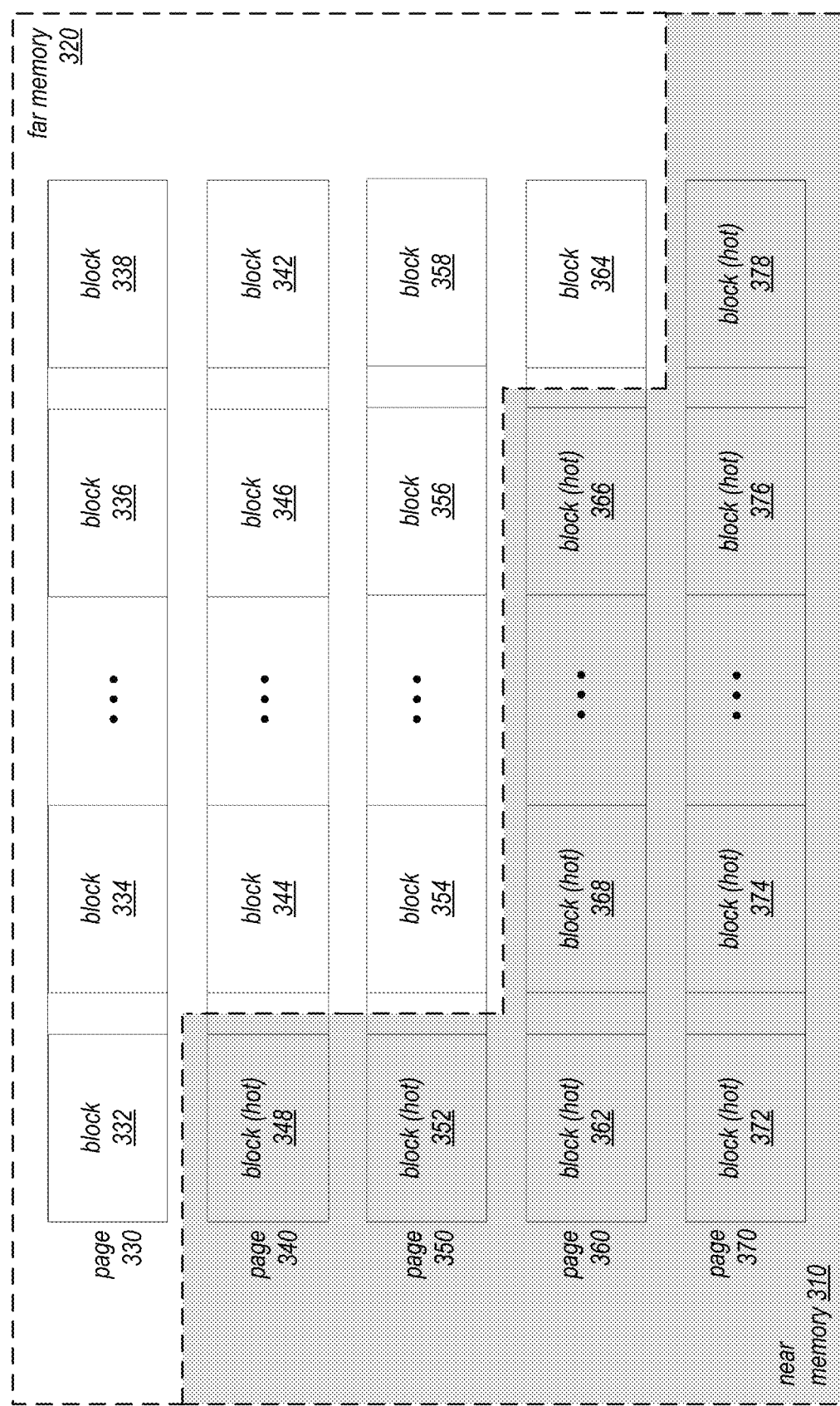
FIG. 3B illustrates an example data memory layout of a heterogeneous memory system after a hardware block remapping of memory pages, according to some embodiments.

FIG. 3B illustrates an example data memory layout of a heterogeneous memory system after a hardware block remapping of memory pages, according to some embodiments. As shown, where hot blocks (e.g., blocks 348 and 368) are demanded heavily, they may be migrated to the NM region of a page. In the example shown in the figure, all hot blocks are located in the NM region, and the NM capacity is not wasted by fetching undesirable blocks or being held empty due to filtering. In some embodiments, there may be cases where the number of hot blocks is slightly larger than the number of blocks that NM region can hold in a page. For example, one page may contain three blocks that are hot and only two blocks can reside in the NM region. In this case, there might be slight interference due to blocks competing for the NM region. In some embodiments, this problem may be solved by offering more configurations where more combinations of NM to FM ratios in a page are provided.

Although the embodiments above have been described in considerable detail, numerous variations and modifications will become apparent to those skilled in the art once the above disclosure is fully appreciated. The present disclosure contemplates all such variations and modifications.

Figure 4:
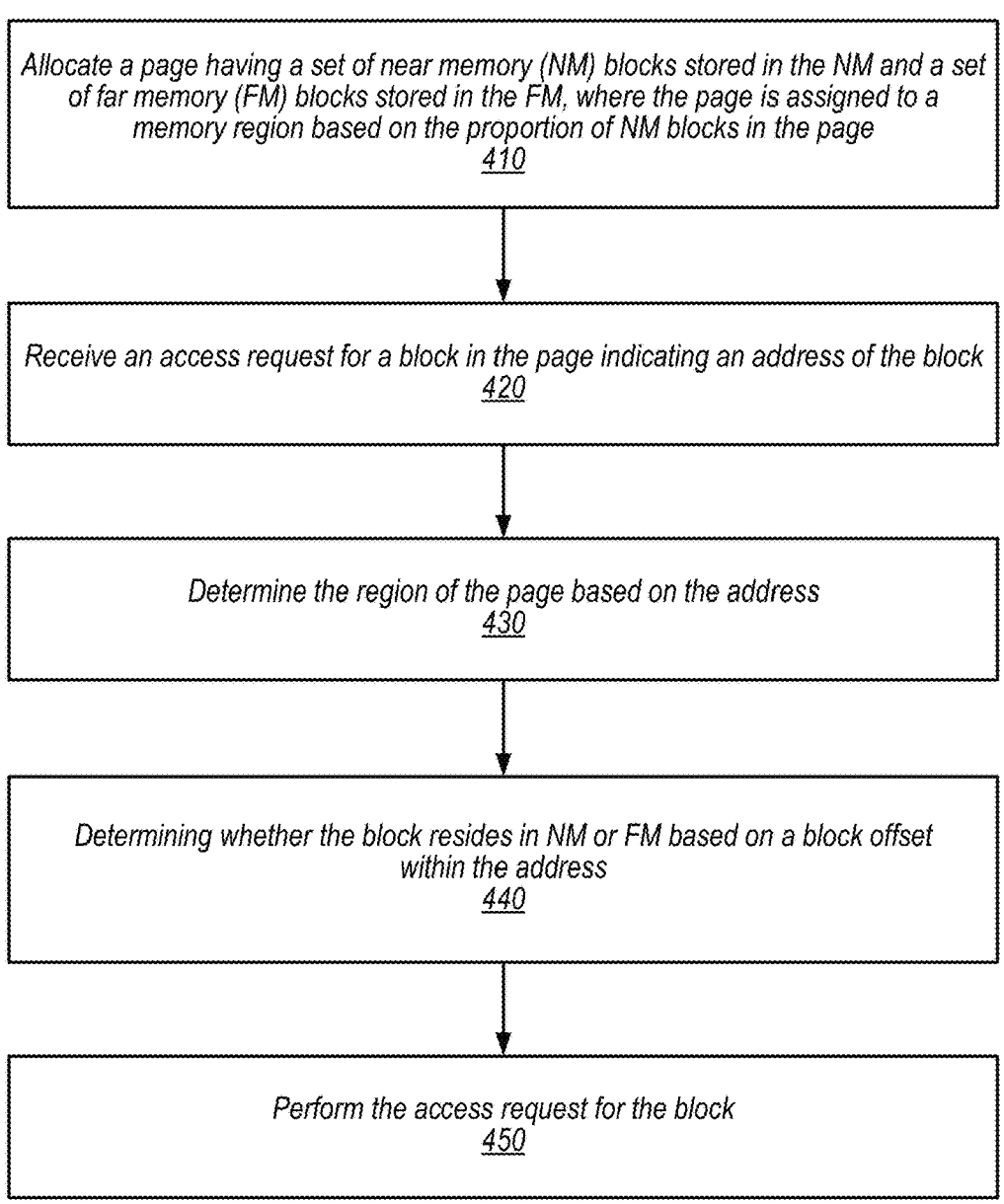
FIG. 4 is a flowchart illustrating example operations of a heterogeneous memory system, according to some embodiments.

FIG. 4 is a flowchart illustrating example operations of a heterogeneous memory system, according to some embodiments. At operation 410, a page is allocated in the heterogeneous memory system. The heterogeneous memory system may use two types of memory, a low-latency near memory (NM), and a high-latency far memory (FM). In some embodiments, the NM may be more expensive or have less capacity than the FM. In some embodiments, the NM may be close to a processor core than the FM. The page may be allocated to have a set of near memory (NM) blocks stored in the NM and a set of far memory (FM) blocks stored in the FM. In some embodiments, the memory space of the heterogeneous memory system may be logically divided into regions. Pages allocated from different regions may have different proportions of NM versus FM blocks. For example, pages in a first region may have 25% NM blocks and 75% FM blocks, while pages in a second region may have 50% NM block and 50% FM blocks. In the operation, the page may be assigned to a memory region in the memory system based on the proportion of NM blocks in the page. For example, in an example heterogeneous memory system, the memory space may be divided into four regions, each region holding pages having a different fraction of NM and FM blocks.

At operation 420, an access request for a block in the page is received. The request may indicate an address for the block. The access request may be a read request or a write requests, which may be received by an operating system (e.g. OS 152 of FIG. 1) from an application hosted by the operating system. The operating system may then forward the access request to a memory system controller, which in some embodiments may be implemented in hardware.

At operation 430, a region of the page in the memory system is determined based at least in part on the address. Operation 430 may be performed for example by a memory system controller (e.g. memory controller 140 of FIG. 1). In some embodiments, the address may be a physical address referring to a physical location in hardware. In some embodiments, the address may be a mapped address maintained in volatile memory. In some embodiments, configurable boundary registers are maintained for the boundaries of the different memory regions, and the address may be compared to the values in these boundary registers to determine its region.

At operation 440, a determination is made whether the requested block resides in NM or the FM of the page, based on a block offset within the address. In some embodiments, the offset is compared against the contents of one or more hardware auxiliary comparator that is specific to the region. For example, if the block offset value is smaller than the comparator value, the access request may be forwarded to the NM. On the other hand, if the block offset value is larger than the comparator value, the access request maybe forwarded to the FM. In this manner, the block is located in the memory system and, at operation 450, the access request (e.g., a block read or write) is performed.

Figure 5:
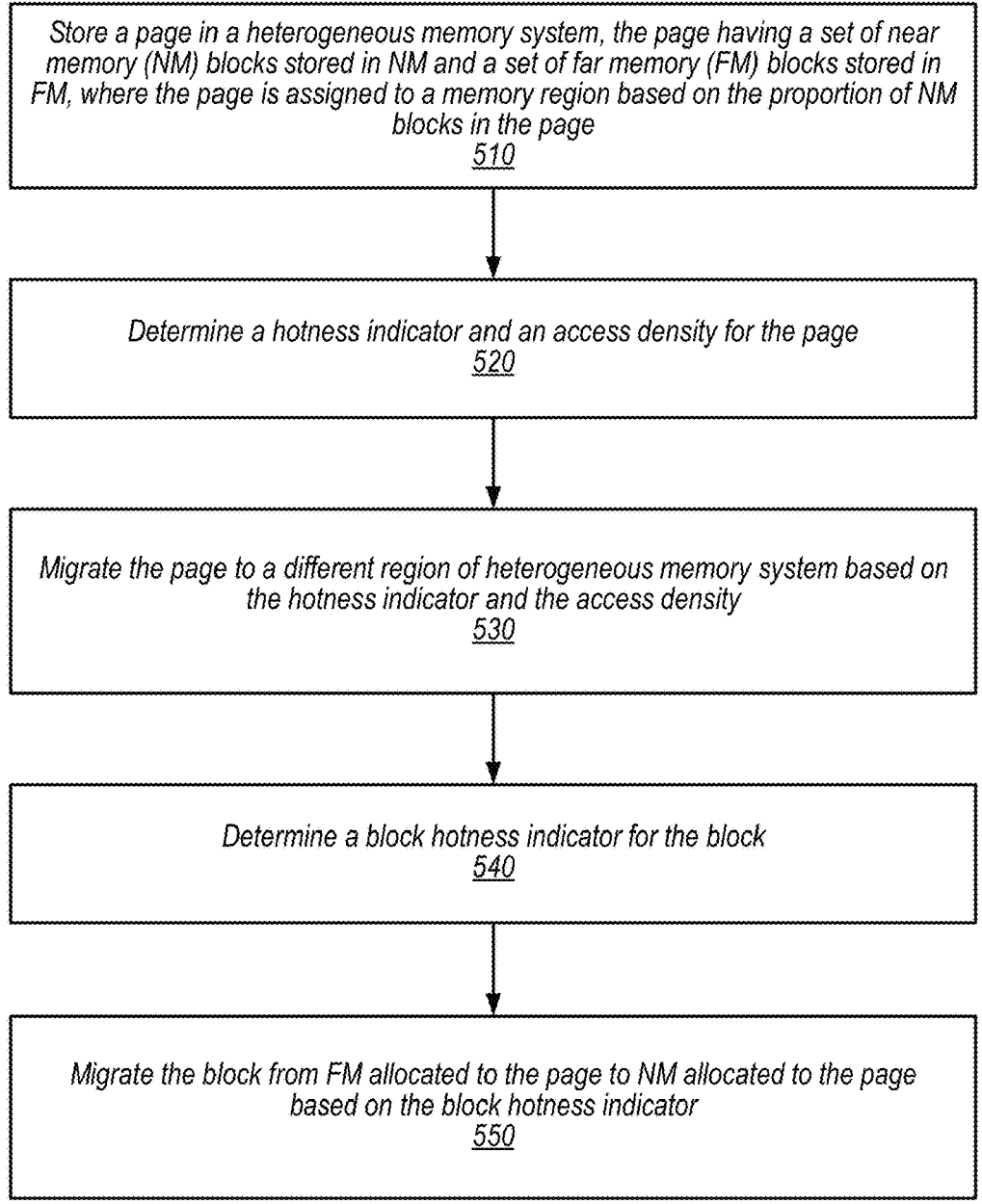
FIG. 5 is another flowchart illustrating example operations of a heterogeneous memory system, according to some embodiments.

FIG. 5 is another flowchart illustration example operations of a heterogeneous memory system, according to some embodiments. The operations of FIG. 5 may be performed by a combination of the OS and various hardware of the heterogeneous memory system, as discussed above. At operation 510, a page is stored in a heterogeneous memory system. In some embodiments, the page may have a set of near memory (NM) blocks stored in the NM and a set of far memory (FM) blocks stored in the FM. In some embodiments, the page is assigned to a memory region based on a specified proportion of NM blocks in the page.

At operation 520, a hotness indicator and an access density is determined for the page. In some embodiments, the OS may monitor a page access count for each memory page during a time period. When the access count crosses a specified threshold, a special bit may be set in the Page Table Entry (PTE) for the page. The bit may indicate that the page is hot. In some embodiments, during each time period, a dynamic access count threshold is determined for the time period. The threshold may be compared against the access count of each page to determine whether the page should be migrated. For example, in some embodiments, the dynamic access count threshold may be set to select a top number of pages to be migrated. In some embodiments, hardware is used to determine the access density of the page. In some embodiments, the translation lookaside buffer (TLB) of the system is extended to include a bit vector to track the access of each block in a page, where each bit indicates whether a given block is accessed or not while the page is cached. In some embodiments, when a page is evicted from the TLB, the number of set bits in the page may be summed up and used to determine the access density.

At operation 530, the page is migrated to a different region of the heterogeneous memory system based at least in part on the hotness indicator and the access density. In some embodiments, the migration may be performed periodically in epochs. In each epoch, all pages requiring a change of region may be migrated. By migrating the pages in epochs, interruptions to the normal operations of the memory system is reduced. In some embodiments, the memory system may migrate only pages that are indicated to be hot by the hotness indicator. In some embodiments, the hot pages may be reassigned to different regions based on their access density. For example, a page that has a large number of accessed or hot blocks may be placed in a region where a large proportion of the blocks are stored in the NM. On the other hand, a page with few number of hot blocks may be placed in a region where relatively few blocks are stored in the NM.

At operation 540, a block hotness indicator is determined for the block. In some embodiments, blocks within a page may be located on the FM, even when the page itself may reside in a region with a large proportion of NM blocks. In some embodiments, the OS may not have full visibility or control of the placement of blocks within the page, and so hardware support may be used to implement operation 540 and 550. In some embodiments, a remap structure may be implemented in hardware to track the hotness of each block within the page. In some embodiments, the hotness indicator may simply indicate a block to be hot whenever it is accessed.

At operation 550, the block is migrated from the FM blocks to the NM blocks of the page based at least in part on the block hotness indicator. In some embodiments, the depending on the relative hotness of the blocks, a block may be migrated from the NM to the FM. In some embodiments, the upon a block access, a NM block and a FM block within a page may be swapped. In some embodiments, the block migration may strive to place the maximum number of hot blocks in the NM. In some embodiments, the hardware may maintain a remap structure to indicate metadata about each block in the memory system. In some embodiments, when a block is migrated from NM to FM or vice versa, an entry in the remap structure corresponding to the migrated block is updated. In some embodiments, the remap structure is stored in the same memory as the data, for example, as bit in the NM row that stores the NM blocks. As the blocks are migrated within a page, the bits may be updated by the memory controller.

Performance Results

Embodiments of the heterogeneous memory system were observed in studies against other memory systems. During the studies, a Simics™-based Flexus simulator was used to simulate one embodiment of the memory management scheme. The configuration models used a 16-core processor similar to SPARC™ T5 processor. For memory timing model, a modified version NVMain simulator was used. Timing and configuration parameters of heterogeneous memories are listed in Table 1. However, these parameters are merely exemplary and may be altered to suit the needs of a particular system. A virtual-to-physical address translation was implemented and an 8 KB page size was used to be consistent with Solaris™ OS page size. Since Simics™ is running Solaris™ on SPARC™ processor, the 8 KB default Solaris page size was chosen although other page sizes (e.g., 4 KB in x86-64) are possible in the heterogeneous memory system embodiment. It was assumed that FM to NM capacity ratio is 4:1 to emulate future systems where NM is a fraction of the FM capacity. For NM memory, High Bandwidth Memory (HBM) generation 2 technology and derived timing parameters from publicly available sources. Phase-Change Memory (PCM) technology is used as FM memory with latency parameters derived from prior work and public sources. The baseline (random) for the studies is a system with NM and FM memories. However, the pages are randomly placed across NM and FM address space, and once they are placed, they are placed in the same location until the end of execution unless a page fault occurs. Thus, the baseline does not consider different bandwidth/latency characteristics of NM and FM, and rather, treats them the same. First touch is a scheme which always brings new pages into NM. When NM is full, new pages are brought into FM instead. Same as the baseline, in first touch scheme a page is never moved until a page fault evicts the page. The execution time is calculated using the time when all threads in all cores terminate. The speedup (figure of merit) is calculated using the total execution of the baseline over the execution time of a corresponding scheme, and therefore, higher speedup represents higher performance.

TABLE 1

Study Parameters

| | Values |
|---|---|
| Processor | |
| Number of Cores (Freq) | 16 (3.2 GHz) |
| Width | 4 wide out-of-order |
| Caches | |
| L1 I-Cache (private) | 64 KB, 2 way, 4 cycles |
| L2 D-Cache (private) | 16 KB, 4 way, 4 cycles |
| L2 Cache (shared) | 8 MB, 16 way, 11 cycles |
| HBM | |
| Bus Frequency | 500 MHz (DDR 1 GHz) |
| Bus Width | 128 bits |
| Channels | 8 |
| Ranks | 4 Rank per Channel |
| Banks | 2 Banks per Rank |
| Row Buffer Size | 2 KB (open-page policy) |
| tCAS-tRCD-tRP-tRAS | 7-7-7-28 (memory cycles) |
| PCM | |
| Bus Frequency | 400 MHz (DDR 0.8 GHz) |
| Bus Width | 64 bits |
| Channels | 4 |
| Ranks | 1 Rank per Channel |
| Banks | 4 Banks per Rank |
| Row Buffer Size | 32 KB (open-page policy) |
| tCAS-tRCD-tRP-tRAS | 1-48-1-0 (memory cycles) |

An embodiment of the heterogeneous memory system disclosed herein is compared against other designs: Alloy Cache, CAMEO, Part of Memory (POM). Alloy Cache uses NM as a cache, so it does not take advantage of the NM capacity as visible memory. It uses a direct mapped organization where 64 B cacheline blocks are migrated between FM and NM. CAMEO is an improvement over Alloy Cache where the NM capacity is a visible memory space, so the system benefits from the added capacity. Part of Memory manages data at 2 KB granularity, so it exploits the spatial locality beyond 64B and gets additional performance.

A representative collection of 6 benchmark from CloudSuite 2.0 was run on Flexus. Cassandra is a Data Serving workload relying on Yahoo!™ Cloud Serving Benchmark (YCSB), which is a framework to benchmark data store systems. Classification is a Data Analytics workload composed of Mahout running on top of Hadoop. Cloud9 is a Software Testing benchmark, which acts as a service software. It runs software testing using symbolic execution with dynamic and heterogeneous resources that are loosely connected over an IP network. Cloudstone is a Web Serving benchmark which uses the PHP version of Olio. It directly serves static files from disk or passes the request to the stateless middleware in backend DB such as NoSQL™. Nutch is a Web Search benchmark, which uses Nutch/Lucene™ search engine. Hundreds of search requests are handled by each ISN and shards are sized to fit into memory of the ISNs. The Media Streaming benchmark consists of two main components: A client and a server. The client component emulates real world clients by sending requests to stress a streaming server. The length and quality of videos requested by the client can be controlled by the client interface with the default setup closely following real world setups. The client system is used to send requests to a media streaming server that supports the RTSP protocol, like the Darwin Streaming Server application that is used in the benchmark. Three out of six benchmarks are Java workloads. All the workloads are run on SPARC™ architecture and tuned to steady state before any observation or measurement is performed.

Table 2 summarizes the workload composition and related characteristics in the studies. All reported MPKI (missed predictions per 1000 instructions) is the LLC (last level cache) MPKI computed per 16-core, and the footprint is calculated by counting the total number of unique pages seen from LLC misses.

TABLE 2

Workload Descriptions

| Workloads | Footprint (MB) | MPKI |
|---|---|---|
| Cassandra | 4308 | 5.291 |
| Classification | 4309 | 4.182 |
| Cloud9 | 5398 | 8.170 |
| Cloudstone | 1981 | 2.909 |
| Nutch | 917 | 2.000 |
| Streaming | 2488 | 4.587 |

Performance Evaluation

Figure 6A:
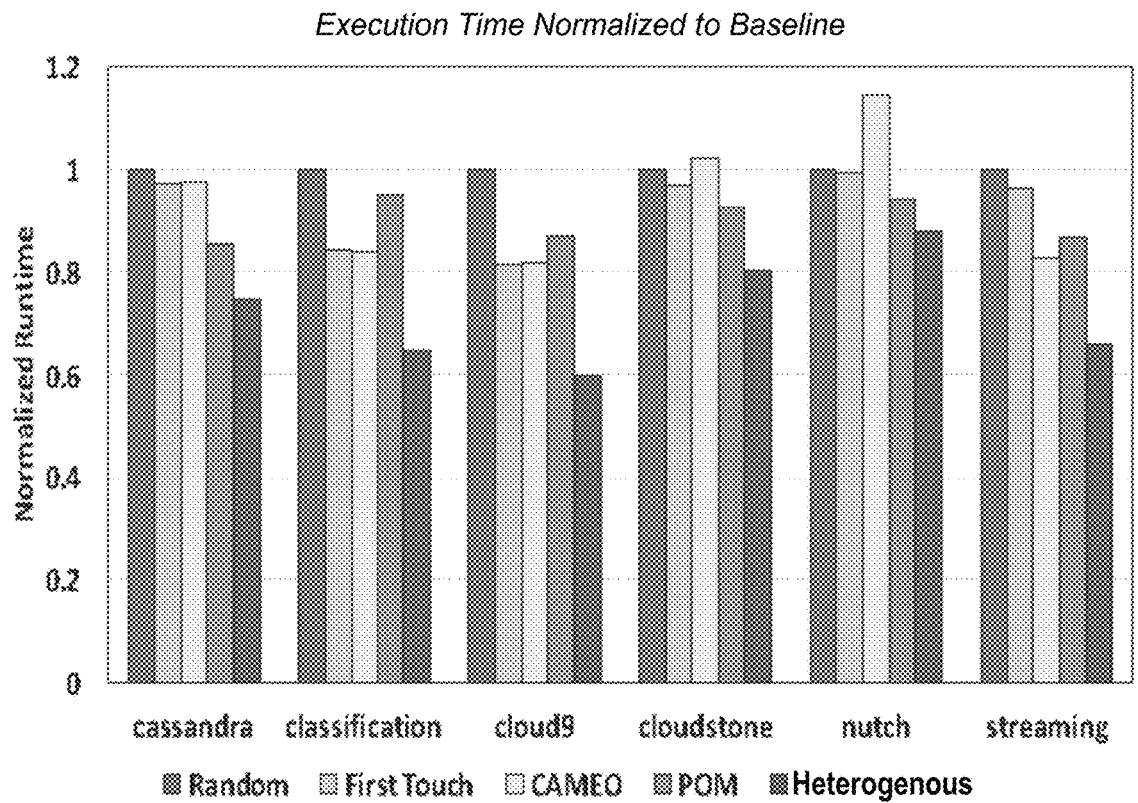
FIGS. 6A-6G are graphs depicting various performance results using an embodiment of a heterogeneous memory system, according to some embodiments.

In the studies, the performance results for an embodiment of the heterogeneous memory system is compared to baseline, a slightly improved scheme (first touch,) and various other schemes on 6 selected typical cloud application workloads. In FIG. 6A, the baseline performs the worst (longest in execution time) in general because it does not leverage the presence of NM which has higher bandwidth and shorter latency instead treating NM and FM with no difference. First touch is slightly better since it takes characteristics of NM into account, but hot pages change over time and sticking pages which are initially hot in NM loses performance as over a few epochs pages in NM are no longer hot and most recent hot pages are placed into FM because NM is full. CAMEO is better than the two naive schemes because it keeps the most recent hot blocks in NM. However, CAMEO does not necessarily obtain good performance as there may be cases where two competing blocks contend the slot in NM and when these two blocks are accessed alternatively they are thrashing the slot in NM. In such case, not only access to any of these two blocks always goes to FM but swapping the blocks incurs high overhead which is a waste of bandwidth. POM is even better than aforementioned schemes as POM does not immediately swaps a block when it is accessed. Instead, it keeps a counter for each slot in NM and swaps the block only when a threshold is met. This way POM largely avoids thrashing of two competing blocks and save swapping overhead. Another gain POM has is it also benefits from larger blocks it manages.

The heterogeneous memory embodiment outperforms all the other schemes evaluated because it captures hot pages and reduces migration overhead at once. All new pages are initially placed in pure NM region to ensure they get most benefit from NM as newly allocated pages are most likely to be hot pages in the next several epochs. When a page is no longer hot, the associating counter will detect that the page is cold in the end of the epoch and the page will be moved to pure FM region such that NM always has room for new pages. In other cases, pages with few hot blocks will be moved to regions whose NM portions match total size of these blocks and leave pure NM region for new pages and pages whose blocks are all hot. For the case in which multiple blocks contend for a slot in NM performance in both CAMEO and POM schemes degrade, the heterogeneous memory embodiment moves the page to the region which accommodates all hot blocks in NM and gets rid of swapping overhead once and for all. This saves a great deal of swapping overhead and still gives good performance for hot blocks. In some situations, NM hit ratio of the heterogeneous memory embodiment is the same as that of POM; however, the heterogeneous memory system still gets better performance because POM manages data in 2 KB granularity and hence incurs even more costly swapping overhead. The heterogeneous memory embodiment here only migrates data at epoch boundary which is a larger time period. Thus, migration cost is amortized to a relatively small amount.

NM Hit Ratio

Figure 6B:
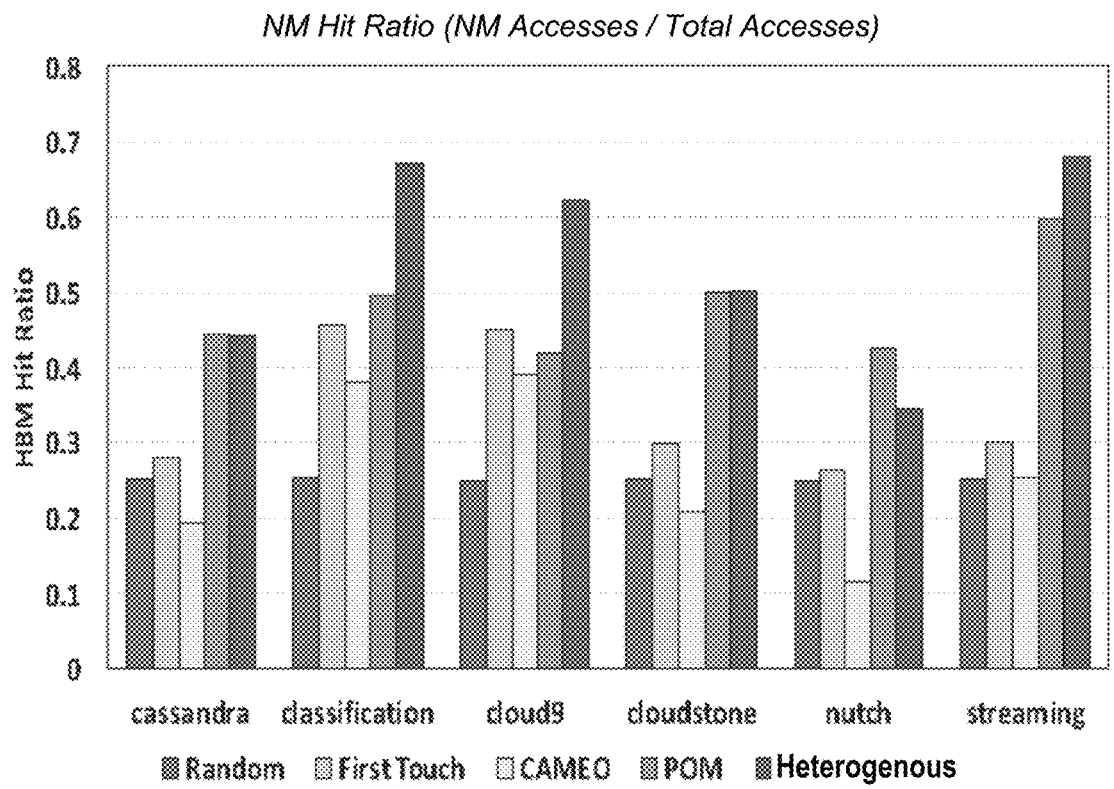

Conceptually, the perfect scheme performs well by leveraging temporal and spatial locality of data and managing most accesses to hit in NM as well as reducing migration cost to the least at the same time. NM hit ratio is a good indicator on whether a scheme captures and leverages locality of workloads. As the NM to FM ratio in the heterogeneous memory embodiment is 1:4, randomly placing pages in the whole memory gets roughly one fourth of accesses to hit in NM. This matches the hit ratio of the baseline as can be seen in FIG. 6B. Hit ratio of first touch is higher because any available space in NM is always guaranteed to be used before FM is filled. CAMEO does not always have higher hit ratio than baseline, as thrashing would cause hit ratio in NM to be very low, for workloads like nutch. POM has very high hit ratio because it leverages spatial locality by swapping larger blocks into NM. The heterogeneous memory embodiment in general has the highest hit ratio of all due to flexibility of the scheme which makes it better adapt to multiple patterns of accesses of workloads.

Besides comparison between schemes, it is also interesting to look at hit ratio across workloads. As shown, some workloads that have good locality such as classification and cloud9 are easy to capture in NM resulting in high hit ratios. The trend is consistent across different schemes except random which does not take locality into account. The thrashing effect is especially high in nutch and footprint of nutch is also the smallest. A lot of data reuse occurs in this workload and this irregular access pattern causes CAMEO perform worse. This is the only workload for which POM has a higher hit ratio than the heterogeneous memory embodiment because of better spatial locality in 2 KB blocks.

Bandwidth

Figure 6C:
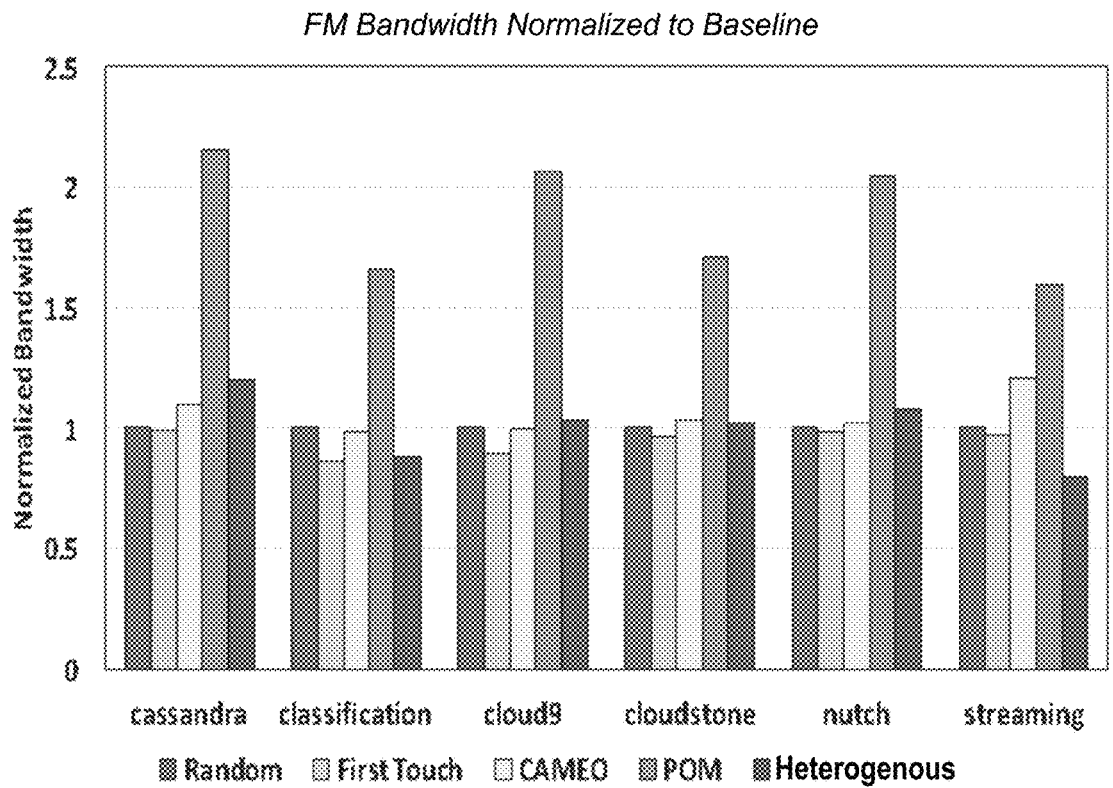

FM bandwidth is another good indicator of performance for the schemes evaluated. It gives insights into how much data is migrated during the execution. If a scheme places undue burden on memory bandwidth from swapping overhead, performance of a memory intensive workload is very likely to be bad because bandwidth is the bottleneck and the mismanagement of the scheme only makes things worse. In FIG. 6C, the baseline uses up small amount of bandwidth for there is no swapping at all. Similarly, first touch does not consume much bandwidth, either. Instead, since fewer accesses go down to FM, first touch actually consumes less FM bandwidth than baseline. CAMEO uses only a little more bandwidth as whenever a miss in NM happens, a swapping of 64 B block is performed, resulting in a request to FM. Only when thrashing of certain blocks happen, bandwidth usage increases. POM has rather high bandwidth consumption as 2 KB data transfer between NM and FM is needed whenever a swap happens, which almost doubles the bandwidth. This characteristic of hogging the bandwidth is not desirable as most cloud applications operate on huge amount of data and often the memory bandwidth is already on a tight budget. On the other hand, the heterogeneous memory embodiment consumes similar bandwidth to baseline while achieving high hit ratio in FM. This is because the migration in this embodiment is done once every epoch, which is not as frequent as POM transfers data. The migration cost is largely amortized as mentioned before.

Using NM as Cache vs. as Added Capacity

Figure 6D:
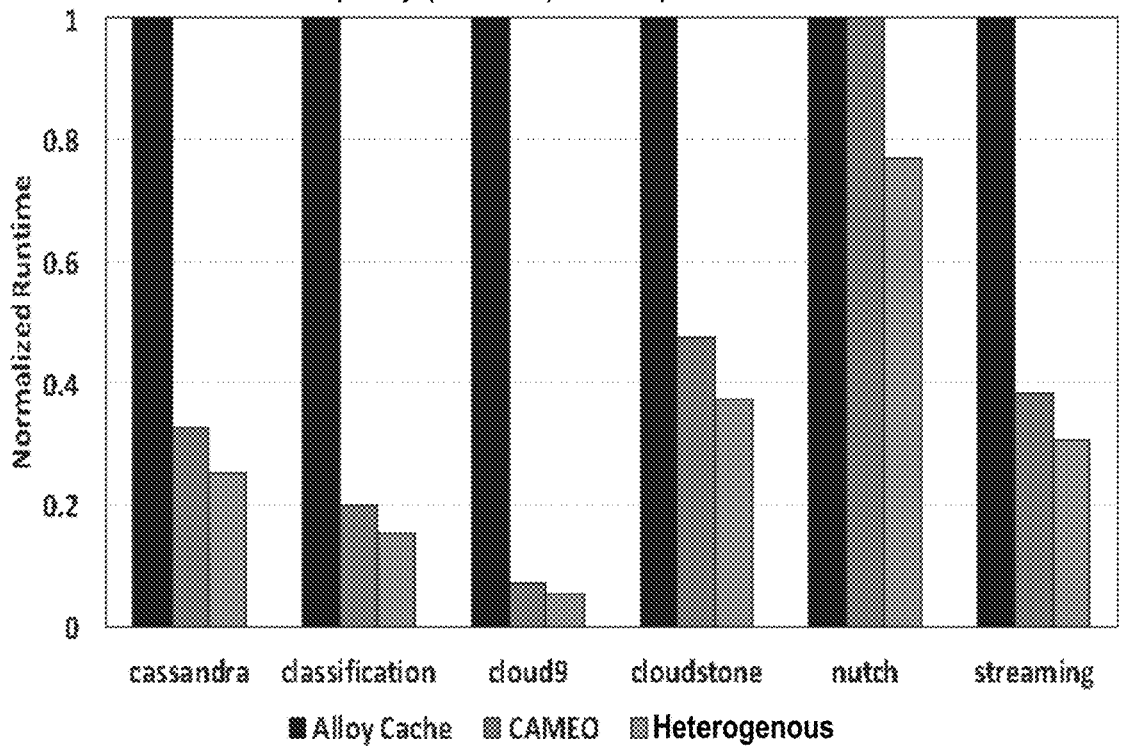

Studies were also performed on performance improvement of using NM as additional capacity over using NM as cache. The most naïve scheme to utilize NM is to treat it as a level of cache between LLC and FM, e.g. Alloy Cache. The typical capacity ratio of NM to FM is 1:4 or even higher. Therefore, not adding capacity of NM into the memory space is a significant loss. In such case, total capacity of memory space is much smaller and the system is subject to a critical number more page faults. FIG. 6D shows comparison between using NM as cache or as part of whole memory. All execution time is normalized to performance of Ally Cache. It is seen that significant amount of reduction in runtime when NM is used as added capacity and performance is improved by 3.2× (CAMEO), and 4.2× (heterogeneous memory embodiment). In nutch, since the footprint of nutch is smaller than 2 GB, the working set is completely memory resident and CAMEO essentially regresses to Alloy Cache so no difference is observed. The 4.2× non-linear improvement of evaluated system with 1:4 NM to FM ratio reemphasizes the importance to use NM as part of memory, much less systems with even higher NM to FM ratios.

Hardware Remapping

Figure 6E:
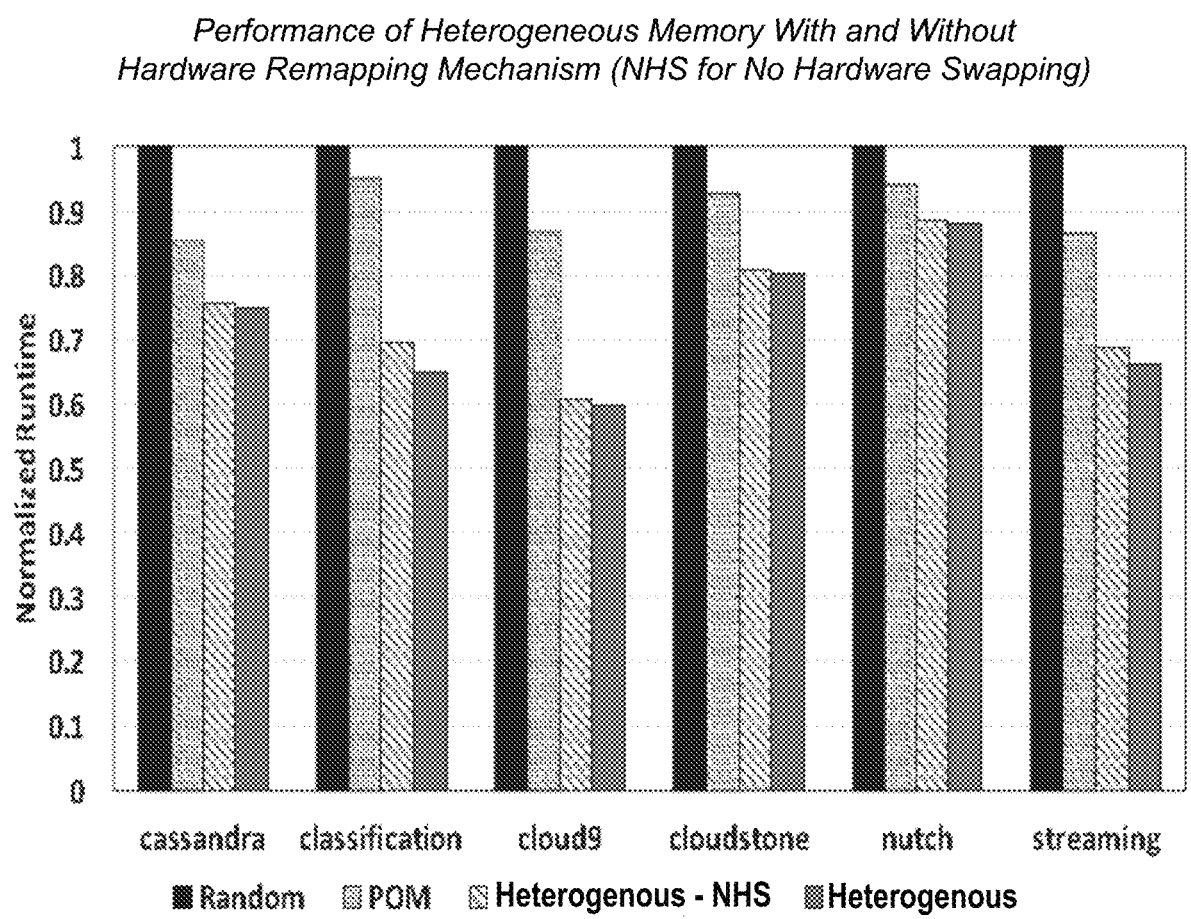

The performance effect of disabling hardware remapping mechanism was also examined. The heterogeneous memory embodiment in this case largely relies on heterogeneous configuration of NM and FM. If the remapping mechanism is disabled, the memory system still benefits from OS migrating pages to pure NM region as access into this region never miss in NM. However, in the other mixed regions, things get tricky because without remapping an access may very likely to miss despite the fact that the capacity of NM portion in the region does accommodate hot blocks. In FIG. 6E, all execution time is normalized to baseline and POM is included for comparison. It turned out that OS page managing part of the heterogeneous memory embodiment accounts for large portion of performance improvement. The hardware remapping improves performance by less than 10%. This is largely due to the setup of the studies. In the study only 4 regions were used: pure FM, two mixed regions with 1:127 and 64:64 NM to FM ratio, and pure NM. There is no performance difference in pure FM and NM regions as no swapping of blocks is needed. In 1:127 region, missing in the NM block does not largely affect performance because there is only 1 NM block and the likelihood and overall impact is rather small. In 64:64 region, since there are already half of total blocks are NM blocks, in such scenario performance may not necessarily significantly differentiates between enabling and disabling remapping mechanism as the probability for an access to hit in NM is high enough. For other possible NM to FM configurations, however, remapping mechanism becomes important especially for ratio such as 32:96 and the like because it is important to get performance benefit from NM and remapping helps to significantly improve hit ratio in NM in such cases.

Sensitivity to NM Size

Figure 6F:
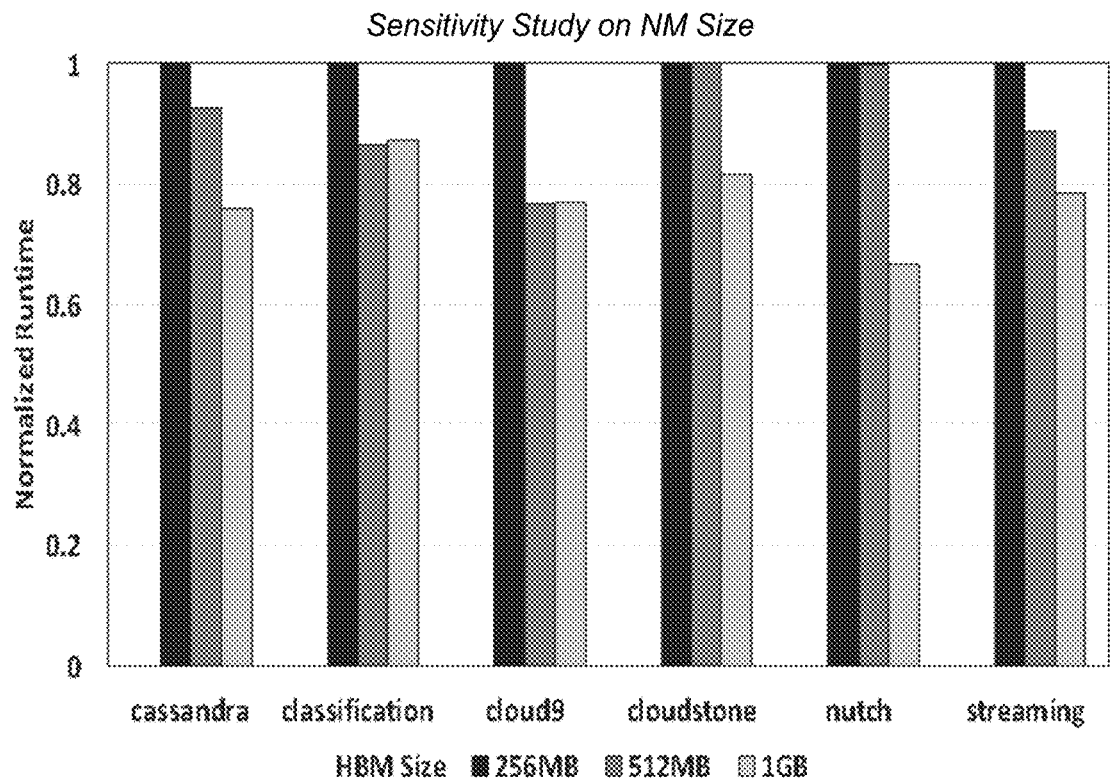

A sensitivity study of the heterogeneous memory embodiment to NM capacity was performed. In FIG. 6F, results are shown of three studies where capacity of NM is the only independent variable and FM size is kept to be 2 GB. The studies tried 256 MB NM, 512 MB NM which is default size of the heterogeneous memory embodiment, and 1 GB NM. In other words, ratio of NM to FM is also changed from 1:2, 1:4, to 1:8. As can be seen, larger NM gives better performance in general, e.g. cassandra and streaming. More NM capacity accommodates more hot pages and improves performance, which is expected. In classification and cloud9, however, performance saturated at 512 MB. Classification and cloud9 have many short lived hot pages and 512 MB NM is good enough for accommodating those, which is good as they get most benefit out of hardware without wasting resources. On the other hand, cloudstone and nutch have performance improvements only after a certain amount of capacity is reached. This is again due to fervent thrashing and all the useful pages get kicked out until there is enough room for the page to stay with so many other pages brought in in between.

Sensitivity to Epoch Length

Figure 6G:
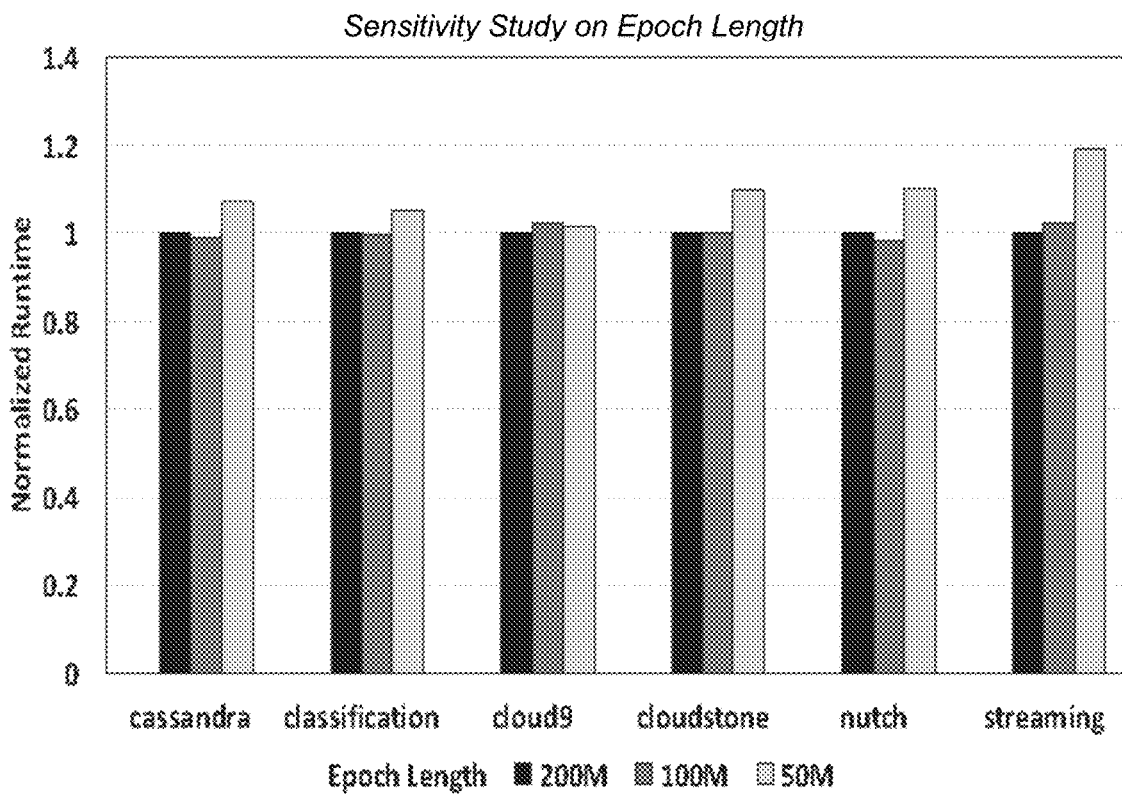

The studies also analyzed the sensitivity of epoch length. Epoch length is important in the heterogeneous memory embodiment as setting the length too short incurs prohibitive migration overhead and too long loses the rich locality which can be better captured with a shorter epoch. In this study, three studies were performed: one with 50 million instructions epoch, another with 100 million which is the default of the heterogeneous memory embodiment, and the other with 200 million instructions. The results are shown in FIG. 6G. It can be seen that the trend that shorter epoch (e.g. 50 M) results in worse performance and performance improvement diminishes as epoch length increases. In some cases, such as cassandra and nutch, the performance even degrades. In general, 100 M instructions epoch performs the best.

Example System Embodiment

In various embodiments, computer system 700 may be used to implement portions of a heterogeneous memory system, as disclosed herein. Computer system 700 a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s).

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers including but not limited to methods for processing distributed ledger messages as a sender node and/or as a receiver node as illustrated in FIGS. 2 through 7, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems 770, or between nodes of computer system 700. In various embodiments, network 760 may include local area networks (LANs), wide area networks (WANs), telecommunication networks, or other suitable types of networks. In some embodiments, computer system 770 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
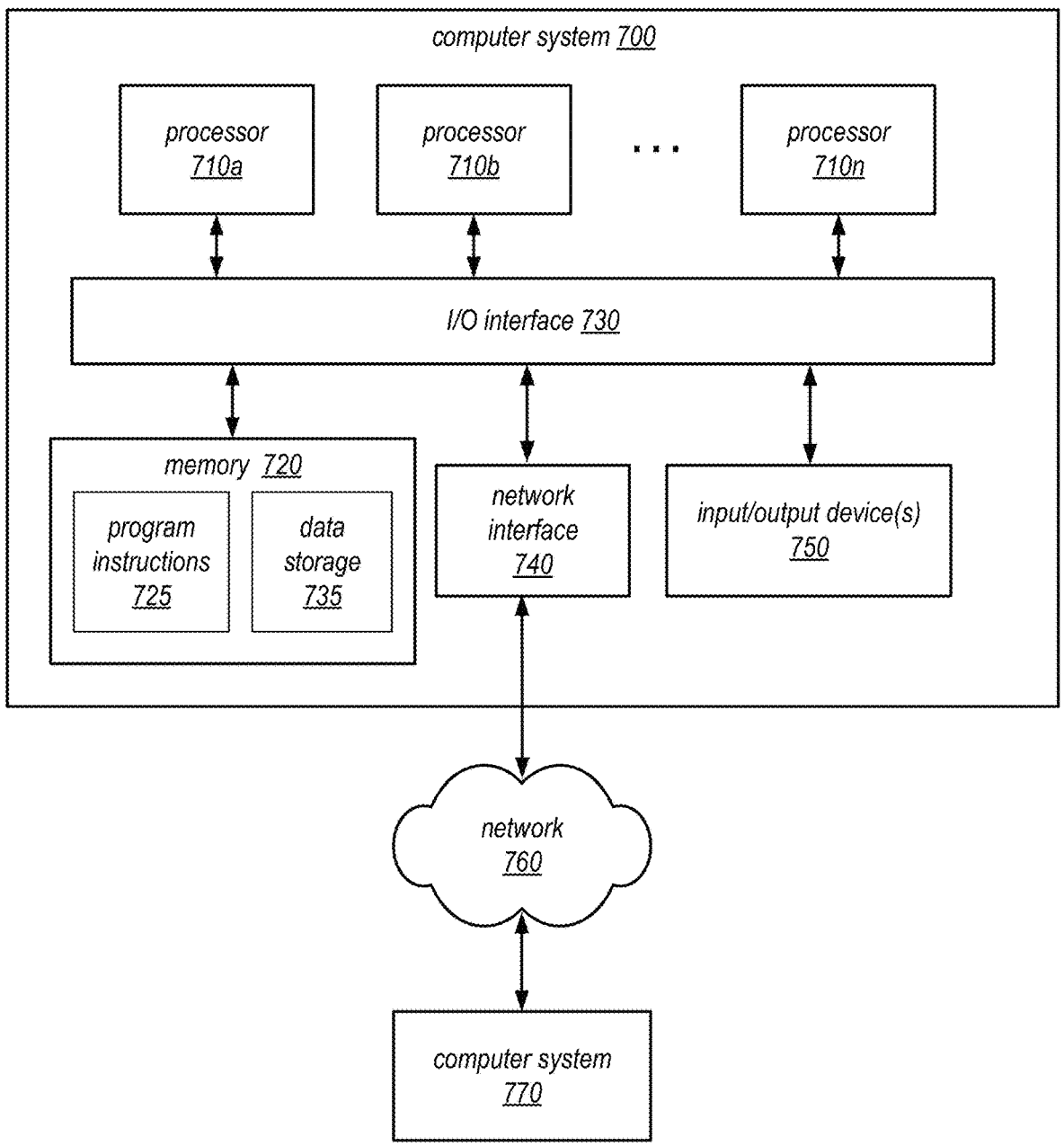
FIG. 7 is an example computer system that may be used to implement the heterogeneous memory system, according to some embodiments.

As shown in FIG. 7, memory 720 may include program instructions 725, configured to implement embodiments of the methods for providing enhanced accountability and trust in distributed ledgers, and data storage 735, comprising various data accessible by program instructions 725. In one embodiment, program instructions 725 may include software elements of embodiments of the methods for providing enhanced accountability and trust in distributed ledgers, as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of the methods for providing enhanced accountability and trust in distributed ledgers as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent examples of embodiments of methods. The methods may be implemented in software, hardware, or a combination thereof. The order of the methods may be changed, and various elements may be added, reordered, combined, omitted, modified, etc. In general, the teachings of this disclosure are provided in terms of examples, which are used to explain the inventive concepts presented herein. These examples do not limit the inventive concepts.

What is claimed is:

1. A computer-implemented method, comprising:
    performing, by a heterogeneous memory system including a low-latency near memory (NM) and a high-latency far memory (FM):
    allocating a page, wherein the page contains a set of NM blocks stored in the NM and a set of FM blocks stored in the FM, and the page is assigned to one region of the plurality of regions based at least in part on a proportion of NM blocks in the page;
    receiving an access request for a block in the page indicating an address for the block;
    determining the region of the page based at least in part on the address;
    determining whether the block resides in NM or FM based at least in part on a block offset within the address; and
    performing the access request for the block.

2. The computer-implemented method of claim 1, wherein determining the region of the page based at least in part on a comparison of the address and contents of one or more region boundary registers.

3. The computer-implemented method of claim 1, wherein determining whether the block resides in NM or FM is performed using an offset comparator for the region.

4. The computer-implemented method of claim 1, further comprising:
    performing, by an operating system of the heterogeneous memory system:
    determining an access density for the page based at least in part on a number of distinct blocks in the page that are accessed in a time period;
    determining a different proportion of blocks in the page to be stored in NM based at least in part on the access density; and
    migrating the page to a different region of the plurality of regions based at least in part on the different proportion of blocks in the page to be stored in NM.

5. The computer-implemented method of claim 4, wherein determining the access density for the page comprises:
   tracking, in a translation lookaside buffer (TLB), individual blocks in the page that are accessed while the page is in a cache; and
   counting a number of the individual blocks that are accessed when the page is evicted from the cache.

6. The computer-implemented method of claim 4, wherein migrating the page to a different region is performed as part of a migration of a plurality of pages, wherein the migration is performed for successive epochs.

7. The computer-implemented method of claim 4, further comprising:
   determining a page hotness indicator of the page based at least in part on an access count of the page in the time period; and
   determining whether to migrate the page based at least in part on the page hotness indicator.

8. The computer-implemented method of claim 7, wherein determining the page hotness indicator comprises:
   comparing the access count with a dynamic access count threshold that changes with different time periods.

9. The computer-implemented method of claim 4, further comprising:
   migrating, by a hardware memory controller of the heterogeneous memory system, the block from FM allocated for the page to NM allocated for the page, in response to an access of the block.

10. The computer-implemented method of claim 9, wherein migrating the block from FM to NM comprises updating a remap entry corresponding to the block to indicate a location of the block in the NM.

11. The computer-implemented method of claim 10, wherein:
    migrating the block from FM to NM comprises storing the block in a NM row; and
    updating the remap entry comprises updating one or more bits stored in the NM row.

12. A system, comprising:
    one or more hardware processors implementing a heterogeneous memory system, comprising:
      a low-latency near memory (NM) and a high-latency far memory (FM);
      an operating system configured to execute on the one or more hardware processors to:
        allocate a page of memory, wherein the page contains a set of NM blocks stored in the NM and a set of FM blocks stored in the FM, and the page is assigned to one region of a plurality of regions based at least in part on a proportion of NM blocks in the page;
        receive an access request for a block in the page indicating an address for the block and forward the access request to a memory system controller coupled to the NM and the FM; and
      the memory system controller, configured to:
        determine the region of the page based at least in part on the address;
        determine whether the block resides in NM or FM based at least in part on a block offset within the address; and
        perform the access request for the block.

13. The system of claim 12, wherein:
    to determine the region of the page, the memory system controller is configured to compare the address with contents of one or more region boundary registers; and
    to determine whether the block resides in NM or FM, the memory system controller is configured to apply an offset comparator for the region to the block offset within the address.

14. The system of claim 12, wherein the operating system is configured to:
    determine an access density for the page based at least in part on a number of distinct blocks in the page that are accessed in a time period;
    determine a page hotness indicator for the page based at least in part on an access count of the page in the time period;
    migrate the page to a different region of the plurality of regions based at least in part on the access density and the page hotness indicator.

15. The system of claim 12, wherein the memory system controller is configured to:
    in response to an access of the block, migrate the block from FM allocated for the page to NM allocated for the page.

16. A non-transitory computer-accessible storage medium storing program instructions that when executed on one or more processors of a heterogeneous memory system, cause the heterogeneous memory system to implement an operating system configured to:
    allocate a page of memory by the operating system, wherein the page includes blocks to be stored in at least two different types of memories, including a proportion of the blocks stored in a low-latency near memory (NM) and another proportion of the blocks stored in a high-latency far memory (FM); and
    assign the page to one region of a plurality of regions of memory based at least in part on the proportion of the blocks in the page stored in the low-latency NM, wherein each region is configured to store pages with a distinct ratio of NM blocks to FM blocks.

17. The non-transitory computer-accessible storage medium of claim 16, wherein the program instructions when executed on the one or more processors cause the heterogeneous memory system to:
    determine an access density for the page based at least in part on a number of distinct blocks in the page that are accessed in a time period; and
    determine a different proportion of blocks in the page to be stored in NM based at least in part on the access density; and
    migrate the page to a different region of the plurality of regions based at least in part on the different proportion of blocks in the page to be stored in NM.

18. The non-transitory computer-accessible storage medium of claim 17, wherein to determine the access density for the page, the program instructions when executed on the one or more processors cause the heterogeneous memory system to:
    obtain from a translation lookaside buffer (TLB) a count of a number of distinct blocks within the page that are accessed while the page is cached.

19. The non-transitory computer-accessible storage medium of claim 17, wherein to migrate the page to a different region, the program instructions when executed on the one or more processors cause the heterogeneous memory system to perform the migration as part of a periodic migration of a plurality of pages across the plurality of regions.

20. The non-transitory computer-accessible storage medium of claim 17, wherein the program instructions when executed on the one or more processors cause the heterogeneous memory system to:
- determine a page hotness indicator of the page based at least in part on an access count of the page in the time period; and
- determine whether to migrate the page based at least in part a comparison of the access count with a dynamic access count threshold that changes with different time periods.

* * * * *

UNITED STATES PATENT AND TRADEMARK OFFICE
CERTIFICATE OF CORRECTION

PATENT NO. : 10,901,894 B2
APPLICATION NO. : 15/853665
DATED : January 26, 2021
INVENTOR(S) : John et al.

It is certified that error appears in the above-identified patent and that said Letters Patent is hereby corrected as shown below:

In the Specification

In Column 1, Line 10, delete "Memorys" and insert -- Memories --, therefor.

In Column 1, Line 34, delete "x86- 64)." and insert -- x86-64). --, therefor.

In Column 2, Lines 54-64, delete "In some embodiments, a heterogeneous memory layout is implemented where two memories are laid out asymmetrically. The operating system may be aware of this layout and places pages with different locality characteristics in different regions of memory. In some embodiments, a custom hardware performs the data remapping to optimize the data placement at finer granularity than what is visible to the operating system. Using the disclosed systems and methods, a multi-component cooperative memory management scheme may be implemented to achieve significant improvements to the overall system performance." and insert the same on Column 2, Line 53, as a continuation of the same paragraph.

In Columns 5-6, Lines 56-67 (Column 5), Lines 1-5 (Column 6), delete "In some embodiments, the block addressing component 142 may implement a number of boundary registers 144, which may be used to mark the transition in the regions. Also, each region may have a preset comparator 146 that specifies whether blocks in that region are in NM 110 or FM 120. Using such auxiliary hardware implemented in the memory controller 140, the access to different memory may be initiated as follows. First, the physical address is compared against the boundary registers 144. Second, the request is forwarded to appropriate regions based on the results of the comparison. Third, an offset of the physical address is compared against auxiliary comparator 146 for the appropriate region. Fourth, the request if forwarded to NM 110 if the offset is smaller than comparator 146 or to FM 120 if the offset larger than comparator 146. In some embodiments, blocks with smallest offsets in each region may be placed in NM 110." and insert the same on Column 5, Line 55, as a continuation of the same paragraph.

In Column 11, Line 57, delete "cacheline" and insert -- cache line --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*

In Column 13, Line 63, after "CAMEO" insert -- to --.

In Column 14, Line 41, delete "Ally" and insert -- Alloy --, therefor.

In Column 16, Lines 16-17, delete "programmer" and insert -- programming --, therefor.